US 9,949,591 B2

(12) United States Patent
Beilock et al.

(10) Patent No.: US 9,949,591 B2
(45) Date of Patent: Apr. 24, 2018

(54) POUR OVER COFFEE MAKER SYSTEM

(71) Applicant: Q HOLDINGS LLC, New York, NY (US)

(72) Inventors: Mark Beilock, New York, NY (US); Adam Paskow, New York, NY (US); Jeff Groves, New York, NY (US)

(73) Assignee: QUIRKY IP LICENSING LLC, New York, NY (US)

( * ) Notice: Subject to any disclaimer, the term of this patent is extended or adjusted under 35 U.S.C. 154(b) by 105 days.

(21) Appl. No.: 15/084,950

(22) Filed: Mar. 30, 2016

(65) Prior Publication Data

US 2016/0287006 A1    Oct. 6, 2016

Related U.S. Application Data

(60) Provisional application No. 62/140,113, filed on Mar. 30, 2015.

(51) Int. Cl.

| *A47J 31/42* | (2006.01) |
| *A23F 5/26* | (2006.01) |
| *A47J 31/56* | (2006.01) |
| *A47J 31/52* | (2006.01) |
| *A47J 31/057* | (2006.01) |

(52) U.S. Cl.
CPC ............... *A47J 31/42* (2013.01); *A23F 5/26* (2013.01); *A47J 31/0573* (2013.01); *A47J 31/52* (2013.01); *A47J 31/56* (2013.01)

(58) Field of Classification Search
CPC .............. A47J 31/42; A47J 31/56; A23F 5/26
See application file for complete search history.

(56) References Cited

U.S. PATENT DOCUMENTS

| 4,510,853 A | 4/1985 | Takagi et al. |
| 5,463,932 A * | 11/1995 | Olson .................... A47J 31/42 |
| | | 241/100 |
| 2011/0217437 A1 | 9/2011 | Leung et al. |

FOREIGN PATENT DOCUMENTS

EP        0 958 770 A      11/1999

OTHER PUBLICATIONS

International Search Report and Written Opinion dated Jun. 20, 2016 received in PCT/US16/24997, 7 pages.

* cited by examiner

*Primary Examiner* — Hoa V Le
(74) *Attorney, Agent, or Firm* — Hard IP LLC

(57) ABSTRACT

A pour-over coffee brewer apparatus comprises a base containing a motor that drives a coffee grinder via a set of gear assemblies, a vertical support structure extending upwards from a rear portion of the base, and a horizontal support structure extending out from a top portion of the vertical support structure, the horizontal support structure comprising a grinder for grinding coffee beans and a water dispenser for dispensing water onto ground coffee beans. The set of gear assemblies comprises a first gear assembly in the base, a second gear assembly in the horizontal support structure, and a gear shaft in the vertical support structure that couples the first gear assembly and the second gear assembly.

13 Claims, 3 Drawing Sheets

POUR OVER COFFEE MAKER SYSTEM

CROSS-REFERENCE TO RELATED APPLICATION

This application claims priority to U.S. Provisional Patent Application No. 62/140,113, filed Mar. 30, 2015, entitled "POUR OVER COFFEE MAKER SYSTEM," the entire contents of which are incorporated herein by reference.

INTRODUCTION

Embodiments described herein relate generally to coffee brewers, and more particularly, to an improved water "pour-over" coffee brewer.

Typically, a pour-over coffee brewing process is done by hand. It involves dispensing water into a brewing substance such as coffee beans and the water infusing and extracting flavors from the brewing substance. However, controlling every variable in the brewing process to create a cup that is exactly suited to one's preference is extremely challenging. Ensuring precise rate, stream and interval of pouring water over the coffee grounds is often critical in making a superior cup of pour-over coffee.

In conventional pour-over coffee brewers, a coffee grinder grinds the coffee beans and dispenses the ground coffee into a filter where water is received. Typically, in such brewers, a grinder motor is located directly next to the grinder to drive the coffee grinder. However, in accordance with the embodiments provided herein, the grinder motor is placed at a distance away from the coffee grinder in order to provide more room for a specific water dispenser.

Embodiments described herein relate to an improved coffee brewing apparatus comprising a unique grinder system in which the motor that drives the coffee grinder is provided at the base of the apparatus and the coffee grinder, which is located at the top of the apparatus, is driven via a plurality of gear assemblies and a gear shaft. In one or more embodiments, the apparatus comprises a microprocessor for automatically activating and controlling the coffee brewing apparatus via an application on a remote mobile device.

DETAILED DESCRIPTION

Figure 1:
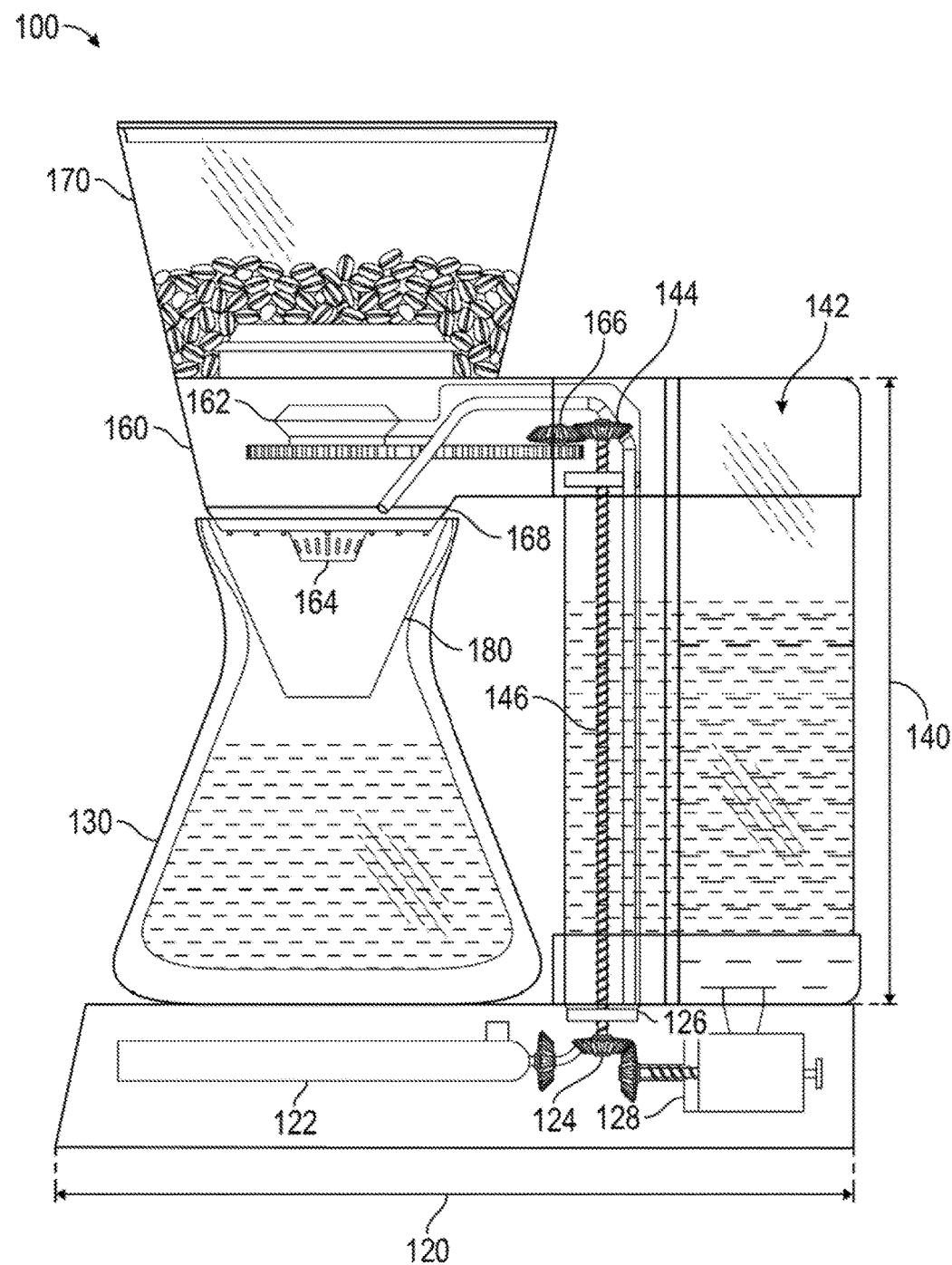
FIG. 1 is a detailed perspective view of an exemplary coffee brewer.
Figure 2:
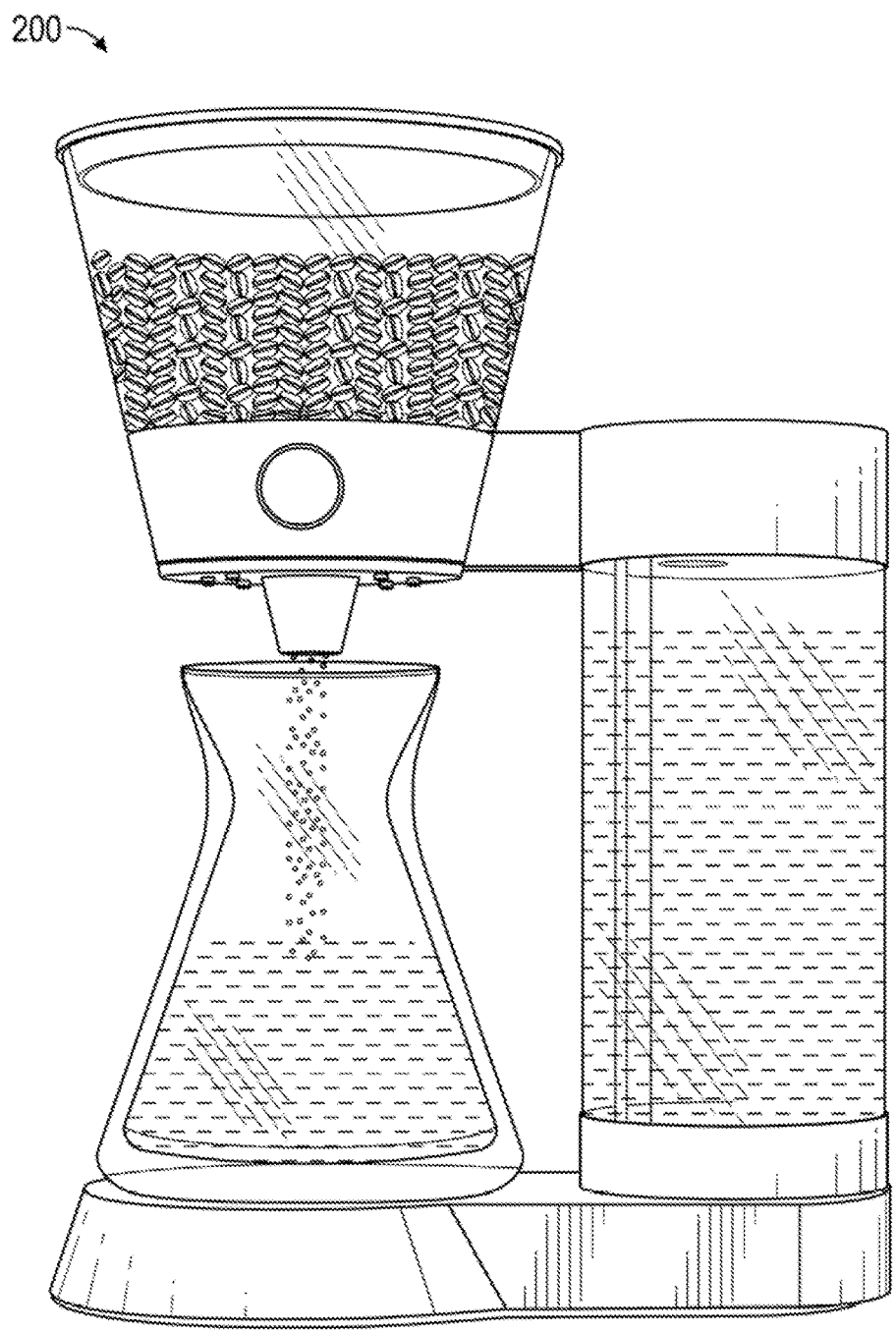
FIGS. 2-3 depict surface views of exemplary embodiments.
Figure 3:
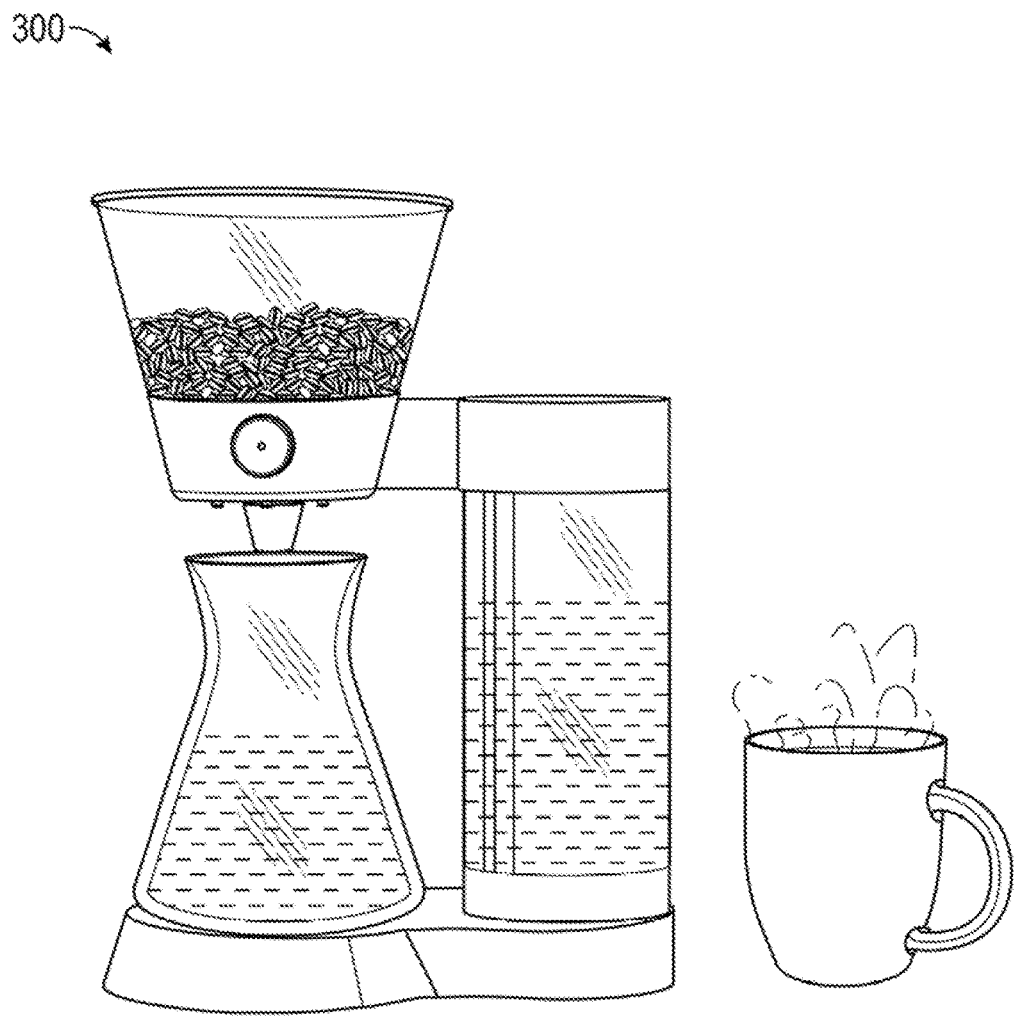

In FIG. 1, an exemplary pour-over coffee brewing apparatus 100 is depicted. The body of the pour-over coffee brewing apparatus 100 comprises a base 120, a vertical support structure 140 and a horizontal support structure 160. The base 120 is configured to contain therein a heater 122, a motor 124, a first gear assembly 126, and a pumping system 128. The base 120 is further configured to support a carafe 130 thereon. The vertical support structure 140 is configured to contain therein a first reservoir 142, a pipe system 144, and a gear shaft 146. The horizontal support structure 160 is configured to contain therein a grinder 162, a water dispenser 164, a second gear assembly 166, and a chute 168. The horizontal support structure 160 is further configured to support a second reservoir 170 thereon and a filter supporter 180 thereunder.

Each component of the exemplary pour-over coffee brewing apparatus 100 is described below in more detail. In some embodiments, the pour-over coffee brewing apparatus may comprise more or less components than are shown in FIG. 1, without departing from the scope or spirit of the claimed invention.

The base 120 may have a flat bottom surface for providing stability to the overall apparatus. The top surface of the base 120 may also be relatively flat in order to provide a secure resting surface for the carafe 130 thereon. The length of the top surface is sufficient to enclose the base of the carafe 130 and the width of the vertical support structure 140. In some embodiments, the length of the bottom and top surfaces of the base 120 are equal, while in other embodiments, the length of the bottom surface exceeds the length of the top surface of the base 120. The height (or the thickness) of the base 120 is sufficient to contain the heater 122, the motor 124, the first gear assembly 126, and the pumping system 128.

The carafe 130 is used for holding the coffee that has been brewed. The carafe 130 may be made of common substances such as, for example, glass or plastic, or any other suitable material. In some embodiments, the carafe 130 may be constructed of double-walled glass. The heater 122 is preferably situated inside the base 120 and directly under the carafe 130. However, in some embodiments, the heater 122 may be situated directly on top of the base 120. Thus, in such embodiments, the carafe 130 rests on top of the heater 122 rather than on the top surface of the base 120. The heater 122 is primarily used for heating the water before dispensing the water over the ground coffee. The heater 122 may also be used to keep the brewed coffee in the carafe 130 at optimal temperatures. For example, in one embodiment, the heater 122 may be configured to maintain the coffee in the carafe 130 at or slightly above 140 degrees Fahrenheit. A thermostat, or any other suitable temperature sensing means (not shown in FIG. 1), may be attached to or near the heater 122 to assist in precisely controlling the desired temperature of the water or the brewed coffee.

In an embodiment, the motor 124 in the base 120 drives the first gear assembly 126. The first gear assembly 126 in turn drives the gear shaft 146 in the vertical support structure 140, which in turn drives the second gear assembly 166 in the horizontal support structure 160. The second gear assembly 160 then drives the grinder 162 in the horizontal support structure 160. The gear assemblies as described herein may comprise, for example, but not limited to, bevel gears, helical gears, and worm gears. The gear shaft 146 may also comprise bushings on each end to assist in coupling the first gear assembly 126 and the second gear assembly 166. In some embodiments, the base 120 may further comprise a power source (not shown in FIG. 1) for providing power that drives the motor 124.

In an embodiment, the pumping system 128 is adapted to pump water from the first reservoir 142. The pumping system 128 first provides the pumped water to the heater 122 for initial heating, and pumps the heated water up to the water dispenser 164 in the horizontal support structure 160 via the pipe system 144 in the vertical support structure 140. The pumped water is then dispensed over the ground coffee beans in the filter.

The arrangement of the components in the base 120 as shown in FIG. 1 are exemplary only. Other suitable arrangements may be deployed without departing from the scope or spirit of the present invention.

As further shown in FIG. 1, the rigid vertical support structure 140 may be configured to extend upwards from a rear portion of the base 120. The vertical support structure 140 may be mainly comprised of the first reservoir 142. The first reservoir is primarily used for holding water for the pour-over coffee brewing apparatus 100. The first reservoir 142 may be a cylindrical container but the design and shape of the first reservoir are not limited to such. The first reservoir 142 may be transparent or configured to show markings which indicate how much water is contained in the first reservoir 142. The pipe system 144 and the gear shaft 146 are placed adjacent to the first reservoir 142. The pipe system 144 and the gear shaft 146 may be housed in a separate chamber that also extends upwardly adjacent to the first reservoir 142. Thus, in some embodiments, the chamber and the first reservoir 142 may form the vertical support structure 140.

As further shown in FIG. 1, the height of the vertical support structure 140 is sufficient to house the carafe 130 between the base 120 and the horizontal support structure 160. The lengths of the pipe system 144 and the gear shaft 146 are configured so as to extend through the vertical support structure 140 and link corresponding components in the base 120 and the horizontal support structure 160.

As further shown in FIG. 1, the rigid horizontal support structure 160 extends out horizontally from the top of the vertical support structure 140 such that the horizontal support structure 160 is arranged opposite the base 120 and also such that the carafe 130 rests in a space formed between the base 120, the vertical support structure 140 and the horizontal support structure 160.

The horizontal support structure 160 comprises the second reservoir 170 on the top surface and the filter supporter 180 on the bottom surface. The second reservoir is primarily used for holding coffee beans prior to grinding. The filter supporter 180 is configured to hold filters (e.g., a filter paper) that are correspondingly sized and shaped to rest on top of the carafe 130.

As shown in FIG. 1, in between the second reservoir 170 and the filter supporter 180, the horizontal support structure 160 comprises the grinder 162 for grinding the coffee beans. The grinder 162 may be, for example, but not limited to, a burr grinder or a blade grinder. When the grinder 162 is a burr grinder, the burr grinder may be a flat burr grinder or a conical burr grinder. The grinder 162 is also configured to be adjustable to different grind settings ranging from extra fine, fine, medium, coarse, and extra coarse. The ground coffee is dispensed into the filter in the filter supporter 180, either manually or automatically, via the chute 168 that is placed directly underneath the grinder 162.

In one or more embodiments, the motor 124 that drives the grinder 162 is located at a distance away from the grinder 162, in the base 120, thereby providing more space around the grinder 162. The empty space is thus occupied by the water dispenser 164. The water dispenser 164 preferably is capable of dispensing water over the ground coffee at a precise rate, interval, and stream. The water dispenser 164 receives the water for dispensing from the first reservoir 142 through the pipe system 144.

The water dispenser 164 typically dispenses the water over a period of several minutes, thereby allowing even blooming of the ground coffee. The water dispenser 164 may distribute the water in a single stream or in a series of precisely timed streams. In some embodiments, the water dispenser 164 is a "shower-head" design for evenly distributing the water. In other embodiments, the water dispenser 164 may rotate or is adapted to rotate for evenly distributing the water.

Accordingly, using the apparatus as described above, a cup of coffee that is exactly suited to one's preference can be brewed by the following process: (1) filling the first reservoir 142 with water and the second reservoir 170 with coffee beans; (2) grinding the coffee beans using the grinder 162; (3) heating the water using the heater 122; (4) pumping the heated water to the water dispenser 164; and (5) precisely dispensing the water to the ground coffee beans using the water dispenser 164.

In an embodiment, the pour-over coffee brewer apparatus 100 may further comprise a microprocessor that controls the overall operations of the apparatus 100. The microprocessor may be placed internally within the base 120, the vertical support structure 140 or the horizontal support structure 160. In other embodiments, the microprocessor may be attached on an external surface of the pour-over coffee brewer apparatus 100.

The pour-over coffee brewer apparatus 100 may further comprise a wireless transceiver in communication with the microprocessor and also a controller operable to communicate over a wireless network with an application on a remote mobile device. Thus, a user can fully operate the pour-over coffee brewer apparatus 100 remotely through a mobile application.

The microprocessor may be programmed to control the water dispenser 164 so as to dispense water over the coffee grounds in a pre-determined time interval. The microprocessor may be further programmed to control the heater 122 to heat the water or the brewed coffee to a pre-determined temperature. The microprocessor may be capable of setting different grinding level for each time. The microprocessor may further be capable of detecting the level of water or coffee beans in the reservoirs using sensors attached to either the first reservoir 142 or the second reservoir 170.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A pour-over coffee brewer apparatus comprising:
    a base containing a motor that drives a coffee grinder via a set of gear assemblies;
    a vertical support structure extending upwards from a rear portion of the base; and
    a horizontal support structure extending out from a top portion of the vertical support structure, the horizontal support structure comprising a grinder for grinding coffee beans and a water dispenser for dispensing water onto ground coffee beans;
    wherein the set of gear assemblies comprises:
        a first gear assembly in the base;
        a second gear assembly in the horizontal support structure; and
        a gear shaft in the vertical support structure that couples the first gear assembly and the second gear assembly.

2. The apparatus of claim 1, wherein
    the vertical support structure further comprises a first reservoir for holding water; and
    the horizontal support structure further comprises a second reservoir for holding coffee beans.

3. The apparatus of claim 2, further comprising:
    a pumping system in the base for pumping water in the first reservoir to the water dispenser; and a pipe system extending through the vertical support structure for carrying the pumped water from the base to the horizontal support structure.

4. The apparatus of claim 3, further comprising a heater for heating the water in the first reservoir before pumping the water to the water dispenser.

5. The apparatus of claim 4, wherein the heater is placed under a carafe that is resting on the base and the heater heats content inside the carafe.

6. The apparatus of claim 5, wherein the base, the vertical support structure, and the horizontal support structure form a space for placing the carafe to receive brewed coffee.

7. The apparatus of claim 1, wherein the coffee beans that are ground by the grinder are dispensed to a filter via a chute that extends downwardly from a bottom surface of the horizontal support structure.

8. The apparatus of claim 7, wherein the filter rests on a filter supporter that surrounds the chute.

9. The apparatus of claim 1, further comprising a microprocessor, a wireless transceiver and a controller for remotely controlling the pour-over coffee brewing apparatus.

10. The apparatus of claim 9, wherein the controller is operable to communicate over a wireless network with an application on a mobile device for remotely controlling the pour-over coffee brewing apparatus.

11. The apparatus of claim 10, wherein the microprocessor is programmed to dispense the water over ground coffee beans at a pre-determined time interval.

12. The apparatus of claim 11, wherein the microprocessor is further programmed to heat the water or brewed coffee to a pre-determined temperature.

13. The apparatus of claim 12, wherein the microprocessor is further programmed to detect a level of water or coffee beans in respective reservoirs using sensors.

* * * * *